US007760741B2

(12) United States Patent
Biran et al.

(10) Patent No.: US 7,760,741 B2
(45) Date of Patent: *Jul. 20, 2010

(54) NETWORK ACCELERATION ARCHITECTURE

(75) Inventors: Giora Biran, Zichron Yaakov (IL); Zorik Machulsky, Gesher HaZiv (IL); Vadim Makhervaks, Austin, TX (US); Renato John Recio, Austin, TX (US); Julian Satran, Atlit (IL); Leah Shalev, Zichron Yaakov (IL); Ilan Shimony, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 826 days.

This patent is subject to a terminal disclaimer.

(21) Appl. No.: 11/132,100

(22) Filed: May 18, 2005

(65) Prior Publication Data
US 2006/0262796 A1    Nov. 23, 2006

(51) Int. Cl.
*H04L 12/28* (2006.01)
*G06F 15/16* (2006.01)
*G06F 15/167* (2006.01)

(52) U.S. Cl. .................. 370/395.52; 709/250; 709/212; 370/412

(58) Field of Classification Search .................. 370/412
See application file for complete search history.

(56) References Cited

U.S. PATENT DOCUMENTS 5,629,948 A * 5/1997 Hagiwara et al. ............ 714/748
6,434,620 B1    8/2002 Boucher et al.
2001/0037406 A1 * 11/2001 Philbrick et al. ............. 709/250
2004/0042483 A1 *  3/2004 Elzur et al. .................. 370/463
2004/0049600 A1 *  3/2004 Boyd et al. .................. 709/250
2004/0062267 A1 *  4/2004 Minami et al. ............... 370/463
2004/0148376 A1    7/2004 Rangan et al.
2004/0215746 A1   10/2004 McCanne et al.
2005/0246443 A1 * 11/2005 Yao et al. ..................... 709/227

FOREIGN PATENT DOCUMENTS

WO    WO 2004/021628    *  3/2004

OTHER PUBLICATIONS

Regnier, Greg et al., "ETA: Experience with an Intel Xeon Processor as a Packet Processing Engine", Micro, IEEE, Publication Date: Jan.-Feb. 2004, vol. 24, Issue 1, pp. 24-31.

* cited by examiner

*Primary Examiner*—Daniel J Ryman
*Assistant Examiner*—John Blanton

(57) ABSTRACT

A network acceleration architecture for use with TCP, iSCSI and/or RDMA over TCP, including a hardware acceleration engine adapted for communication with and processing data from a consumer application in a system that supports TCP, iSCSI and RDMA over TCP, a software protocol processor adapted for carrying out TCP implementation, and an asynchronous dual-queue interface for exchanging information between the hardware acceleration engine and the software protocol processor, wherein the hardware acceleration engine and the software protocol processor are adapted to operate asynchronously and independently of one another.

17 Claims, 6 Drawing Sheets

_US 7,760,741 B2_

NETWORK ACCELERATION ARCHITECTURE

FIELD OF THE INVENTION

The present invention relates generally to network acceleration, and more particularly to a network acceleration architecture which allows efficient iSCSI (Internet Small Computer System Interface) and RDMA (Remote Direct Memory Access) acceleration, preserves flexibility of TCP (transport control protocol) implementation, and adapts to increasing main CPU (central processing unit) speed, memory bandwidth and latency.

BACKGROUND OF THE INVENTION

RDMA is a technique for efficient movement of data over high-speed transports. RDMA enables a computer to directly place information in another computer's memory with minimal demands on memory bus bandwidth and CPU processing overhead, while preserving memory protection semantics. RNIC is a Network Interface Card that provides RDMA services to the consumer. The RNIC may provide support for RDMA over TCP.

RNIC can serve as an iSCSI target or initiator adapter. "Initiator" refers to a SCSI command requester (e.g., host), and "target" refers to a SCSI command responder (e.g., I/O device, such as SCSI drives carrier, tape).

Much work has been done to create efficient, scalable and flexible RDMA and iSCSI acceleration solutions, but a successful solution is not trivial. All data processing operations must be handled efficiently, but the protocol implementation must be flexible. The need for flexibility in protocol implementation is particularly important for TCP, which constantly evolves, attempting to adapt TCP behavior to changing network speed, traffic pattern and a network infrastructure. Another challenge is the ability to adapt to increases in main CPU speed, main memory bandwidth and latency.

One example of a prior art solution, which uses RNICs for network acceleration, is that of embedded processors that handle protocol processing. One or more embedded CPUs are tightly coupled with the data path, and touch each incoming and generated packet. There are different hardware acceleration engines surrounding such embedded CPUs, which assist in different data processing operations. Such a solution is generally limited by the embedded CPU capabilities, which typically lag behind the main CPU technology for several generations. This limits the performance benefits and lifetime of such solutions. Latency is relatively high, since before the packet is generated to the network or placed to the memory, it has to be processed by one or more CPUs. To reach high networking rates, multiple CPUs need to be placed on the data path and perform simultaneous handling of multiple packets. This adds additional latency, makes implementation difficult and increases the cost of the overall solution.

Another prior art solution is a state machine implementation. However, this lacks flexibility in protocol processing, which as mentioned previously, is particularly important in TCP.

SUMMARY OF THE INVENTION

The present invention seeks to provide an improved TCP, RDMA and iSCSI network acceleration architecture, as is described more in detail hereinbelow.

In accordance with a non-limiting embodiment of the invention, heavy data intensive operations are separated from the protocol control. Data processing may include "fast path" execution (defined in the description below) performed by a dedicated hardware acceleration engine, whereas the protocol control operations may be carried out by software. The split of functions between software and hardware is done in such way that allows asynchronous and independent operation of the data processing (hardware) and the protocol control (software). There is a "loose" coupling of the software and hardware components. The invention preserves flexibility in protocol implementation and is capable of sustaining protocol modification, without sacrificing performance and efficiency.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
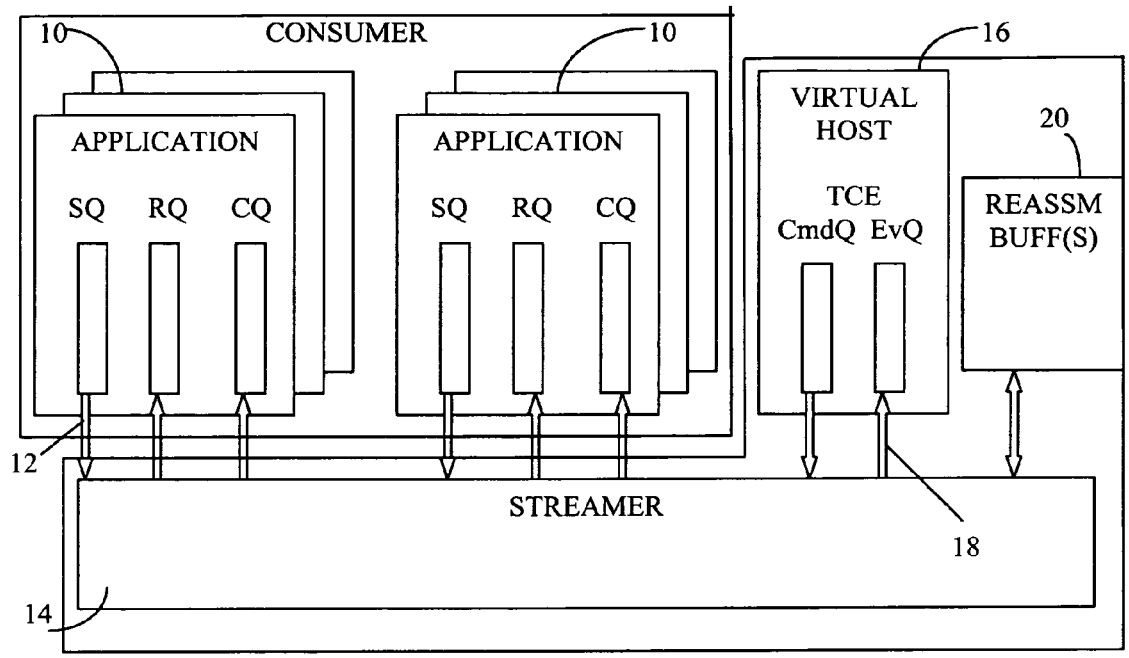
FIG. 1 is a simplified block diagram of a network acceleration architecture in accordance with an embodiment of the present invention.

Reference is now made to FIG. 1, which illustrates a network acceleration architecture in accordance with an embodiment of the present invention.

The network acceleration architecture may include consumer applications 10, which may run on a main CPU complex. The consumer applications 10 may use asynchronous queue based interface(s) 12 to submit work requests to a hardware acceleration engine 14, also referred to as a streamer 14. The interface(s) 12 may be in accordance with the RDMA verb specification.

As is known in the art, RDMA uses an operating system programming interface, referred to as "verbs", to place work requests (WRs) onto a work queue. In brief, queue pairs may be used to transfer messages to the streamer 14 (e.g., memory regions in the streamer 14). Each queue pair may include a send work queue (SQ) and a receive work queue (RQ). For example, the consumer application 10 may generate work requests, which are placed onto a work queue as work queue elements (WQEs). Accordingly, the send work queue may include WQEs that describe data to be transmitted to the streamer 14, and the receive work queue may include WQEs that describe where to place incoming data from the streamer 14. A completion queue may include completion queue elements (CQEs) that contain information about previously completed work queue elements. A completion queue element is a data structure on a completion queue that contains sufficient information to determine the queue pair and specific work queue element that has been completed.

The interface(s) 12 may enable using iSCSI and socket acceleration mechanisms provided by the streamer 14. For example, the streamer 14 may be implemented as an RNIC, which as mentioned above, may provide support for RDMA over TCP and may serve as an iSCSI target or initiator adapter. The RNIC can also provide iSER ("iSCSI Extensions for RDMA") services. iSER is an extension of the data transfer model of iSCSI, which enables the iSCSI protocol to take advantage of the direct data placement technology of the RDMA protocol. iSCSI protocol exchanges iSCSI Protocol Data Units (PDUs) to execute SCSI commands provided by the SCSI layer. The iSER data transfer protocol may slightly change or adapt iSCSI implementation over RDMA; e.g., it eliminates such iSCSI PDUs as DataOut and DataIn, and instead uses RDMA Read and RDMA Write messages. Basically iSER presents iSCSI-like capabilities to the upper layers, but the protocol of data movement and wire protocol is different.

In short, iSCSI uses regular TCP connections, whereas iSER implements iSCSI over RDMA. iSER uses RDMA connections and takes advantage of different RDMA capabilities to achieve better recovery capabilities, improve latency and performance. Since RNIC supports both iSCSI and iSER services, it enables SCSI communication with devices that support different levels of iSCSI implementation. Protocol selection (iSCSI vs. iSER) is carried out on the iSCSI login phase.

The hardware acceleration engine 14 cooperates with a software protocol processor 16, also referred to as a TCP Control Engine (TCE) 16, to provide network acceleration semantics to consumer applications 10. The hardware acceleration engine 14 is responsible to handle all data intensive operations, as described in more detail hereinbelow.

TCE 16 is a software component that implements a protocol processing part of the network acceleration solution. This software component implements the decision making part of the TCP protocol. For example, without limitation, TCE 16 may run on a main CPU, dedicated CPU, or on a dedicated virtual host (partition). Streamer 14 and TCE 16 may use an asynchronous dual-queue interface 18 to exchange information between software and hardware parts of solution. The dual-queue interface 18 may include two unidirectional queues. A command queue (CmdQ) may be used to pass information from the TCE 16 to the streamer 14. An event queue (EvQ) may be used to pass information from the streamer 14 to the TCE 16. Streamer 14 and TCE 16 may work asynchronously without any need to serialize and/or synchronize operations between them. The architecture does not put restrictions or make assumptions regarding the processing/interface latency between the hardware acceleration engine 14 and the software protocol processor 16.

Figure 2:
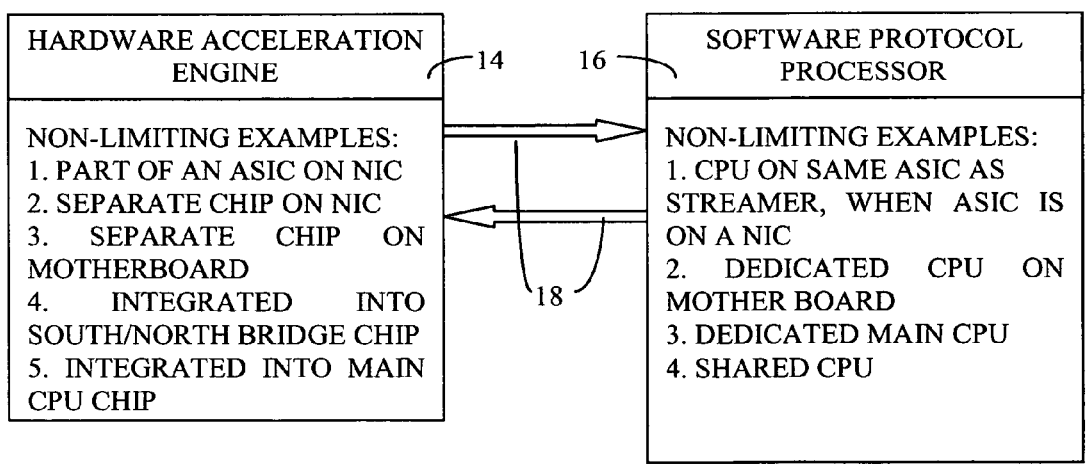
FIG. 2 is a simplified block diagram of different configurations for the streamer and TCE of the network acceleration architecture of FIG. 1.

As seen in FIG. 2, such an architecture allows a wide range of different configurations. For example, without limitation, the hardware acceleration engine 14 can be implemented in a part of an ASIC (application specific integrated circuit) on a NIC (network interface card), a separate chip on a NIC, a chip on a mother board, a south/north bridge chip, a main CPU chip and/or a PCI (peripheral component interconnect) bus controller chipset, or any combination thereof. The software protocol processor 16, without limitation, can run on an embedded CPU on the NIC, a dedicated special purpose CPU on the mother board, a dedicated general-purpose main CPU (e.g., in a multi-CPU system), or share the same CPU with applications running on a dedicated virtual host or partition, or any combination thereof. The invention allows any type of interconnect between the streamer 14 and TCE 16.

Figure 3:
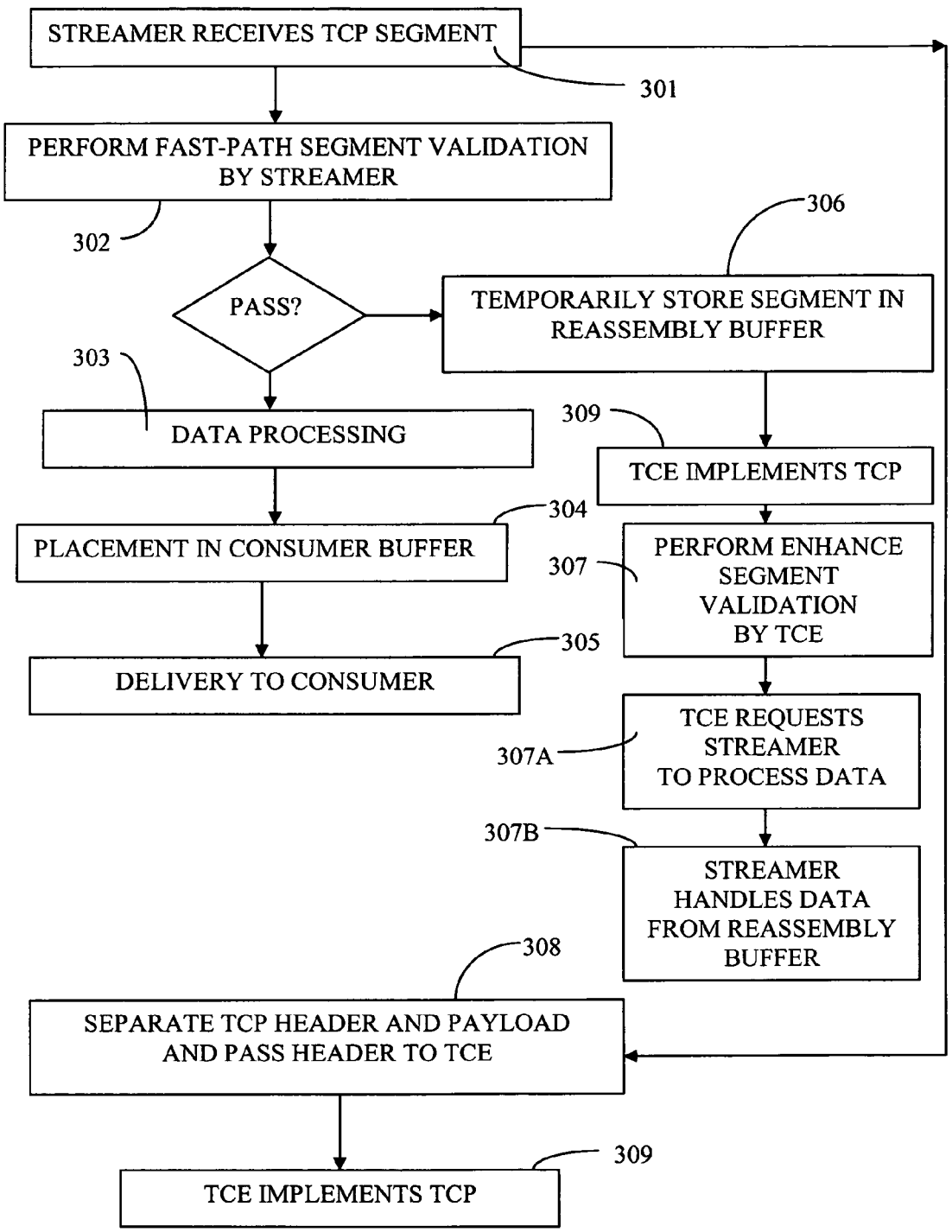
FIG. 3 is a simplified flow chart of receive flow in the network acceleration architecture, in accordance with an embodiment of the present invention.

Reference is now made to FIG. 3, which illustrates a non-limiting embodiment of receive flow in a network acceleration architecture, in accordance with the present invention.

As mentioned above, in the network acceleration architecture of the present invention, the data intensive operations are separated from the complex TCP protocol processing. In simplistic terms, receiving and processing a TCP segment may be split into three parts:

1. Fast-path segment validation
2. Enhanced segment validation
3. Implementation of TCP protocol First, the streamer 14 receives an inbound TCP segment (step 301). The streamer 14 may perform basic validation and classification of the received TCP segment to determine if the received segment belongs to the fast path (step 302). The fast-path validation may include, without limitation, checksum validation, tuple lookup and identification to determine whether the received segment belongs to the fast path. The TCP segment is identified to be a fast-path segment if it passes a predefined TCP validation sequence. Accordingly, "fast path" as used throughout the specification and claims refers to handling and/or processing of a segment that has passed a predefined TCP validation sequence. This validation sequence is sufficient to identify a segment to be a valid TCP segment, which then permits the segment to undergo data processing (step 303), placement to consumer buffers (step 304) and delivery to a consumer without software (TCE) involvement (step 305).

If the segment does not pass fast-path validation, the segment is treated as a slow-path segment, and is temporarily stored in the reassembly buffer(s) 20 (step 306). Note that in some cases a valid TCP segment can fail a fast-validation sequence and be handled in slow path. Accordingly, "slow path" as used throughout the specification and claims refers to handling and/or processing of a segment that has not passed the predefined TCP validation sequence used for the fast path. The slow-path segment validation sequence may then be carried out (step 307), including without limitation, various extended checks that cover different cases not covered by the fast-path segment validation. The slow-path validation sequence is implemented by TCE 16. The TCE 16 may also perform reassembly of slow-path segments placed in the reassembly buffers, including without limitation, issuing a special command to the streamer 14 via CmdQ to process and place data (step 307A). The streamer 14 performs handling of data from the reassembly buffers (step 307B), e.g., requests fetching segments from the reassembly buffers, processes them, and places them in the destination buffers.

The streamer 14 may separate the TCP header and payload of each inbound TCP segment (both fast and slow paths), and pass the TCP header with additional information to the TCE 16 for further processing via the EvQ interface (step 308). The TCE 16 may implement the TCP protocol (step 309), including without limitation, congestion window management, timer management, RTTM (round trip time measurement) estimation, retransmit management, etc. Implementation of the TCP protocol may be carried out asynchronously with the data processing performed by streamer 14, and does not affect/delay data placement and delivery on the fast path. Steps 307, 307A and 307B may be part of step 309.

Figure 4:
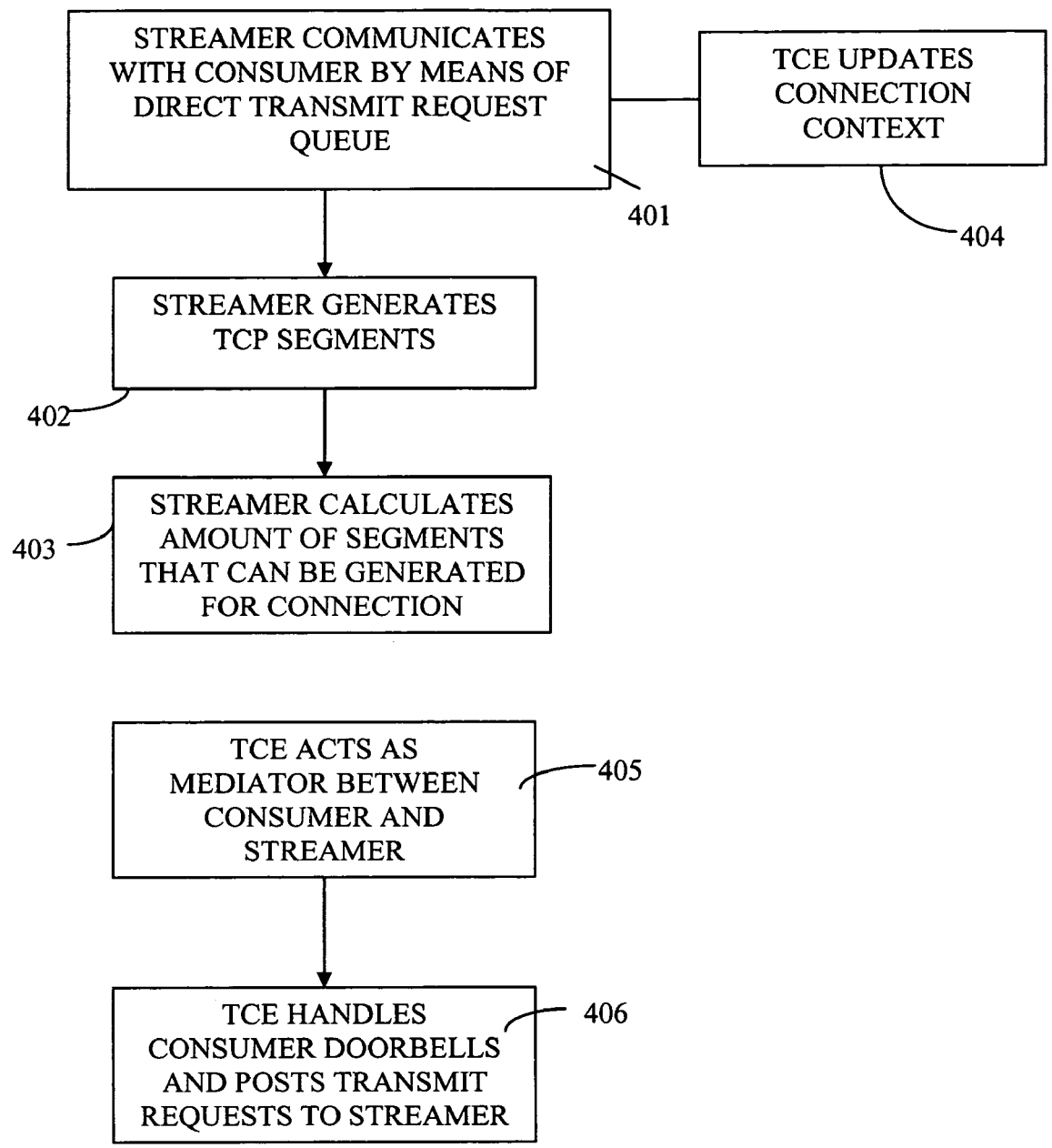
FIG. 4 is a simplified flow chart of transmit flow in the network acceleration architecture, in accordance with an embodiment of the present invention.

Reference is now made to FIG. 4, which illustrates a non-limiting embodiment of transmit flow in a network acceleration architecture, in accordance with the present invention.

As mentioned above, in the network acceleration architecture of the present invention, the data intensive operations are separated from the complex TCP protocol processing. In accordance with one non-limiting embodiment of the present invention, transmitting a TCP segment may be accomplished by streamer 14 communicating with a consumer by means of a direct transmit request queue, including doorbell ("signaling" of new request availability) (step 401). It is noted that streamer 14 generally makes its own decisions regarding transmit, but TCE 16 may affect the transmit decisions indirectly (and asynchronously) by sending context update commands to streamer 14. The consumer may write a transmit request to the transmit request queue and "ring a doorbell" to signal availability of the request.

Streamer 14 may receive the transmit request from the consumer via the direct transmit request queue. Upon receiving these commands, the streamer 14 may generate TCP segments in appropriate network packets for sending to a network. (step 402), and calculate the amount of segments that can be generated for the given connection (step 403). The information in the connection context may be asynchronously updated by TCE 16 (step 404), which may use special context update requests passed via CmdQ interface.

In accordance with another non-limiting embodiment of the present invention, TCE 16 may act as a mediator between the consumer and streamer 14 (step 405). TCE 16 handles consumer doorbells and posts transmit requests to the streamer via CmdQ interface (step 406). In this embodiment, the signaling (ringing doorbell) is carried out indirectly through the TCE 16. This allows TCE 16 to "preprocess" the requests, and make some of the decisions that were left to streamer 14 in the embodiment of steps 401-404. TCE 16 may send transmit commands to the streamer 14. TCE 16 may control, for example (without limitation), the order of connection handling, the exact header fields, the exact amount of data in each packet, and others. The consumer queue based interface is still implemented by streamer 14. The difference between the two embodiments is the amount of flexibility in the transmit TCP implementation. In both embodiments, streamer 14 implements the host interface part and different mechanisms required for it, such as Address Translation Protection, Queue-based interface, etc.

As mentioned hereinabove, streamer 14 is responsible for the management of the reassembly buffers 20. Streamer 14 may manage the buffer spaces of reassembly buffers 20 (e.g., keep track of free/occupied pages), and move data out from reassembly buffers 20 to consumer buffers (upon a command from TCE 16). The reassembly buffer management is now described in more detail with reference to FIGS. 5-7.

In order to better understand the options contemplated in accordance with embodiments of the invention, first an option that poses problems will be described with reference to FIG. 5. The problematic option is that of virtually contiguous buffers, wherein the location of the inbound packet payload in the reassembly buffer is identified by the SN of the packet. A problem with virtually contiguous buffers is that it can lead to data corruption, as is now explained.

Figure 5:
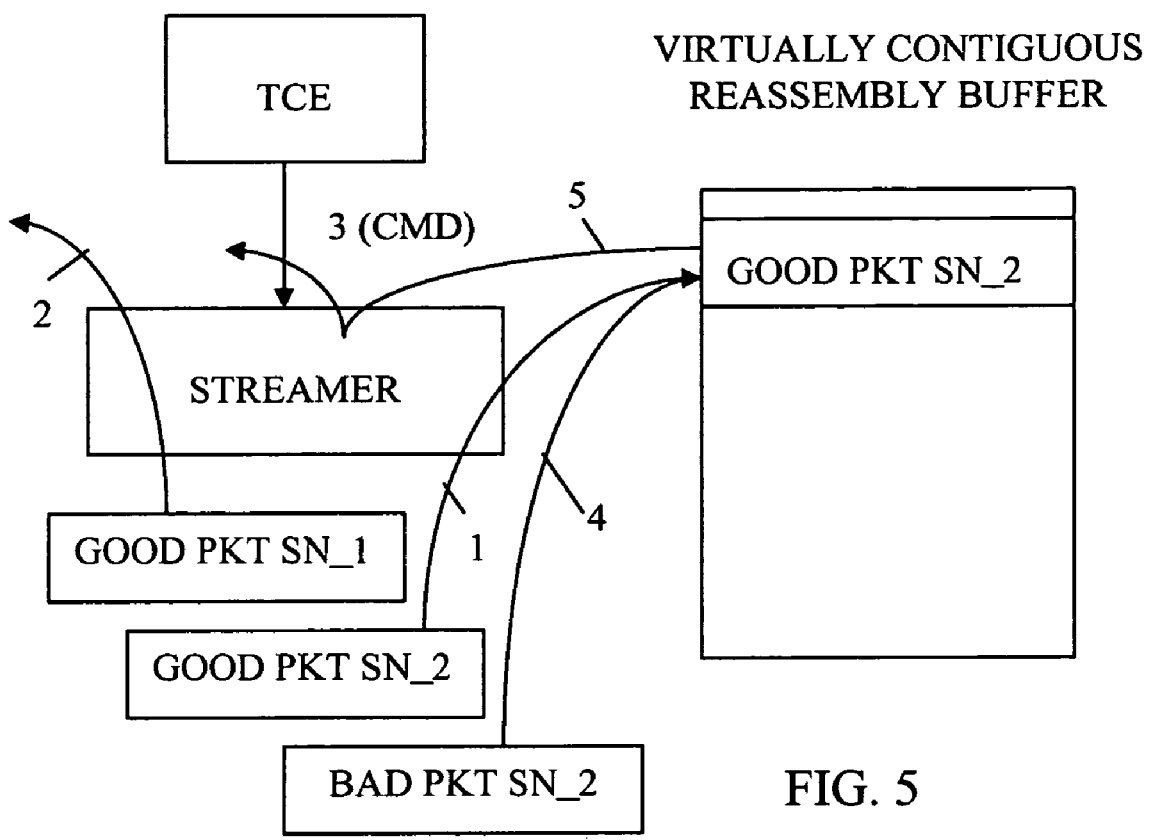
FIG. 5 is a simplified block diagram of reassembly buffer management with virtually contiguous buffers.

As indicated by arrow A in FIG. 5, a valid but out-of-order packet with SN_2 arrives. The packet fails fast-path validation (which checks the in-order), and is placed in its respective place in the reassembly buffer(s) 20, based on the SN carried in the packet (SN_2). The header is passed to TCE 16 for further processing.

Afterwards, a valid packet with SN_1 arrives, which closes the TCP hole. The packet passes fast-path validation sequence, and is placed to the consumer buffers by streamer 14, as indicated by arrow B. The header of the packet is passed to TCE 16 for further processing.

TCE 16 sees the header of the packet with SN_1, and since this packet is now in-order, decides that the packet with SN_2 can now be fetched from reassembly buffer(s) 20 to be processed by streamer 14. However, in the meantime, it is possible that an invalid packet with SN_2 may arrive. This packet fails fast-path validation, and is placed in the respective place in the reassembly buffer(s) 20, based on SN_2, which unfortunately is the same location of the first received valid packet. The header is queued for further processing by TCE 16. Now when the TCE 16 requests the streamer 14 (via CmdQ interface) to fetch the packet with SN_2 from the reassembly buffer(s) 20, the streamer 14 may fetch the incorrect packet thereby causing data corruption.

Figure 6:
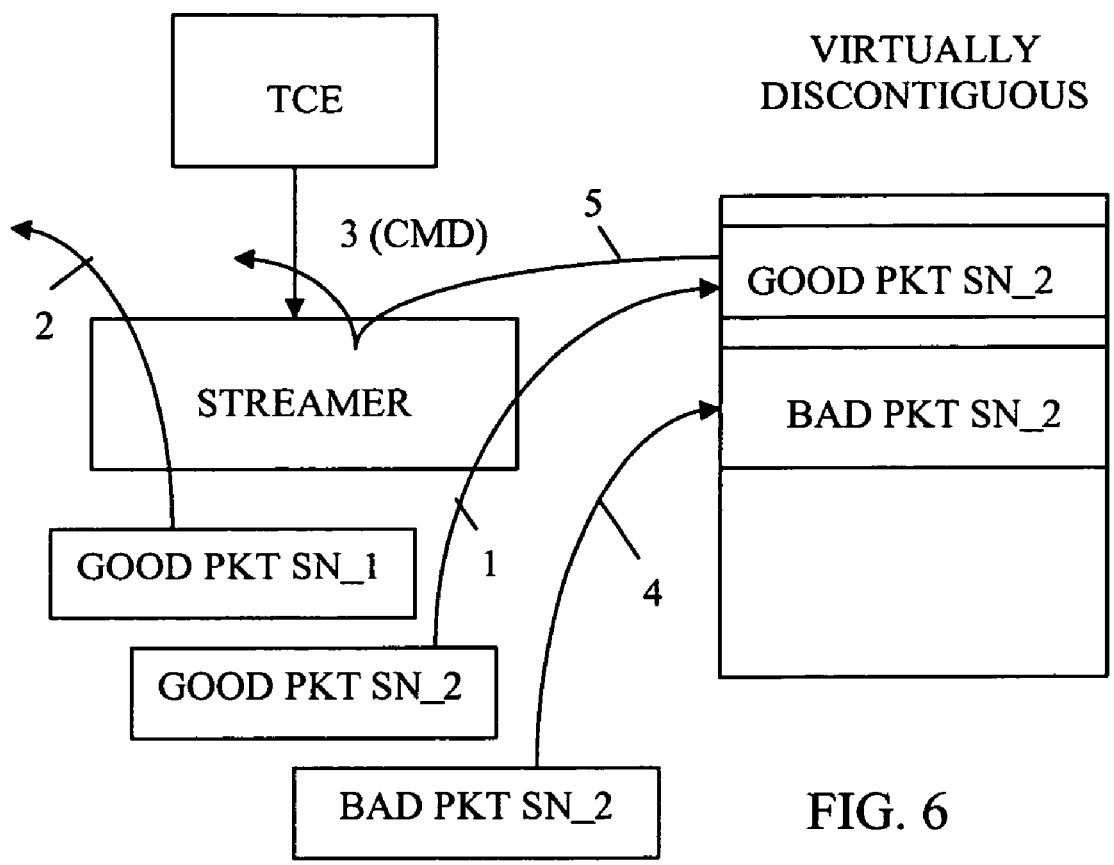
FIG. 6 is a simplified block diagram of reassembly buffer management with virtually discontinuous (per-packet) reassembly buffers, in accordance with an embodiment of the invention.

To prevent data corruption, the present invention may employ virtually discontinuous (per-packet) reassembly buffers as shown in FIG. 6. In such an approach, the payload of each incoming packet is placed in its own virtually contiguous buffer, which may physically consist of one or more physically contiguous memory blocks, regardless of the SN carried by the packet. In this manner, the invalid packet with SN_2, which fails fast-path validation, is placed in its own virtually contiguous buffer, which is not the same location of the first received valid packet. Thus, there is no data corruption in the reassembly buffer(s) 20, since payloads of two different packets cannot be placed to the same memory location.

The streamer 14 may pass address/identifier of the consumer reassembly buffer to the TCE 16 with the packet header, and get this information back from the TCE 16 with the request to fetch the data from the reassembly buffer(s) 20.

However, this approach does have disadvantages. The software and hardware implementations are more complex. There is a potential performance degradation due to the increasing amount of information exchanged between streamer 14 and TCE 16.

Figure 7:
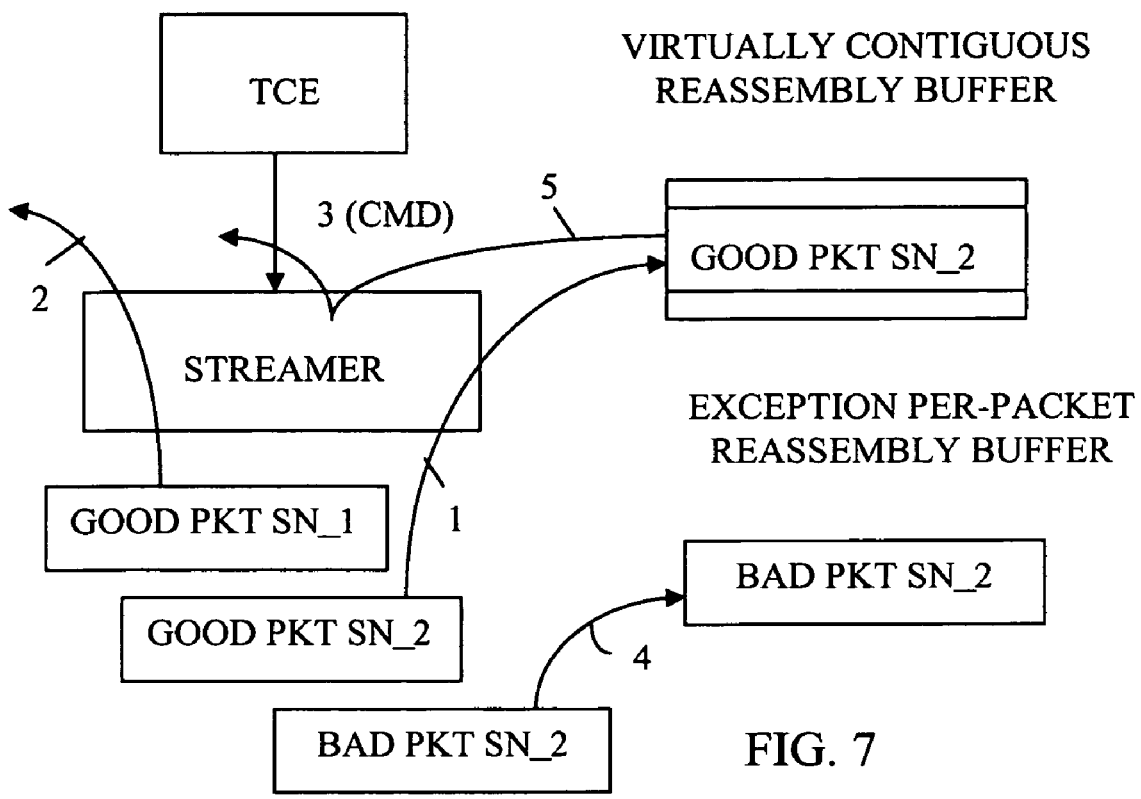
FIG. 7 is a simplified block diagram of reassembly buffer management, in accordance with another embodiment of the invention, wherein virtually contiguous reassembly buffer(s) are used for "good" out-of-order segments, and discontinuous per-packet buffers for "bad" segments.

A preferred approach for reassembly buffer management in accordance with an embodiment of the present invention is now described with reference to FIG. 7. In this approach, virtually contiguous reassembly buffer(s) 20 are used for the "good" out-of-order segments, and discontinuous per-packet buffers for the "bad" segments. This approach separates segments that fail fast-path validation into two types: out-of-order segments which passed all other fast-path validation checks, and segments that failed one or more non-in-order checks. The first type is called "good" out-of-order segments, and the second type is called "bad" segments. "Good" out-of-order segments can be safely passed through the contiguous reassembly buffer(s) 20. The reason is that since they passed all the checks, not just the in-order check, they are valid TCP segments and cannot lead to data corruption. "Bad" segments are passed through discontinuous reassembly buffers, wherein each segment gets its own virtually contiguous buffer.

Streamer 14 may provide TCE 16 with the segment type and additional information for the "bad" segments. When TCE 16 submits a request to fetch data from reassembly buffer(s) 20, it may specify the amount of data that needs to be fetched/skipped from the contiguous reassembly buffers, and if needed, the address/identifier of the discontinuous buffer. Fortunately, most of the data to be fetched from the reassembly buffer(s) 20 are "good" out-of-order segments. Accordingly, the performance degradation both in software and hardware caused by "bad" segments is negligible.

The description of the present invention has been presented for purposes of illustration and description, and is not intended to be exhaustive or limited to the invention in the form disclosed. Many modifications will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Apparatus for network acceleration, comprising:
    a host interface, which is configured to communicate with a consumer application running on a host CPU by exchanging work queue elements via send and receive queues and completion queue elements via a completion queue, and which is configured to receive a doorbell from the consumer application;
    an acceleration engine, which is adapted to exchange Transport Control Protocol (TCP) packets belonging to a given connection with a network and to apply TCP data movement operations to the packets;
    a protocol processor, which operates asynchronously with respect to the acceleration engine and is adapted, in response to the doorbell, to apply TCP control operations to the packets of the given connection simultaneously with the data movement operations applied to the packets of the given connection by the acceleration engine; and
    an asynchronous queue interface, which is separate from the host interface and comprises a command queue and an event queue linking the acceleration engine to the protocol processor, so as to enable processing of the packets,
    wherein the acceleration engine is configured to exchange data conveyed by the TCP packets with the consumer application via the queues of the host interface and to communicate with the protocol processor by reporting events to the protocol processor via the event queue and receiving commands from the protocol processor via the command queue.

2. The apparatus according to claim 1, wherein the acceleration engine is adapted to receive an inbound TCP segment and to perform a fast-path segment validation of the TCP segment to determine if the TCP segment passes a predefined TCP validation sequence.

3. The apparatus according to claim 2, further comprising a reassembly buffer, wherein if the TCP segment does not pass the fast-path segment validation, the TCP segment is treated as a slow-path segment and is temporarily stored in the reassembly buffer.

4. The apparatus according to claim 3, wherein the protocol processor is adapted to perform a slow-path segment validation sequence that checks different cases not covered by the fast-path segment validation.

5. The apparatus according to claim 3, wherein the protocol processor is adapted to perform reassembly of slow-path segments placed in the reassembly buffer.

6. The apparatus according to claim 5, wherein the protocol processor is adapted to issue a command to the acceleration engine so that the acceleration engine requests fetching a TCP segment from the reassembly buffer.

7. The apparatus according to claim 3, wherein the acceleration engine is adapted to manage a buffer space of the reassembly buffer.

8. The apparatus according to claim 3, wherein the acceleration engine is adapted to move the data out from the reassembly buffer to consumer buffers upon a command from the protocol processor.

9. The apparatus according to claim 3, wherein the reassembly buffer comprises a virtually contiguous reassembly buffer and a virtually discontiguous reassembly buffer, wherein a good out-of-order segment received by the acceleration engine that has not passed the fast-path validation is passed by the acceleration engine to the virtually contiguous reassembly buffer, and a bad out-of-order segment received by the acceleration engine that has not passed the fast-path validation is passed by the acceleration engine to the virtually discontiguous reassembly buffer.

10. The apparatus according to claim 2, wherein the acceleration engine is adapted to separate a TCP header and payload of the inbound TCP segment and pass the TCP header with additional information to the protocol processor.

11. The apparatus according to claim 1, wherein the acceleration engine is adapted to use information received from the work queue elements to generate TCP segments.

12. The apparatus according to claim 11, wherein the acceleration engine is adapted to calculate an amount of the TCP segments that can be generated for the given connection.

13. The apparatus according to claim 11, wherein the protocol processor is adapted to update context information asynchronously with respect to the acceleration engine.

14. The apparatus according to claim 1, wherein the protocol processor is adapted to act as a mediator between the consumer application and the acceleration engine.

15. The apparatus according to claim 1, wherein the acceleration engine is implemented as a Remote Direct Memory Access Network Interface Card (RNIC) that provides support for at least one protocol selected from a group of protocols consisting of TCP and Remote Direct Memory Access (RDMA) over TCP, and is adapted to serve as an Internet-Protocol Small Computers Systems Interface (iSCSI) target or initiator adapter.

16. The apparatus according to claim 1, wherein the acceleration engine is implemented in at least one element selected from a group of elements consisting of a part of an ASIC (application specific integrated circuit) on a NIC (network interface card), a separate chip on a NIC, a chip on a mother board, a south/north bridge chip, and a main CPU chip.

17. The apparatus according to claim 1, wherein the protocol processor is implemented in at least one element selected from a group of elements consisting of an embedded CPU on a NIC, a dedicated CPU on a mother board, a dedicated main CPU, and a CPU shared with other applications.

* * * * *